(12) United States Patent
Lai et al.

(10) Patent No.: US 7,341,182 B2
(45) Date of Patent: Mar. 11, 2008

(54) METHOD AND APPARATUS FOR INTEGRATING A MOBILE PHONE WITH A CONTACTLESS IC CARD

(75) Inventors: Cheng-Shing Lai, Taipei (TW); Xiao-Bo Shu, Nankng (CN)

(73) Assignee: Inventec Appliances Corp., Taipei (TW)

( * ) Notice: Subject to any disclaimer, the term of this patent is extended or adjusted under 35 U.S.C. 154(b) by 176 days.

(21) Appl. No.: 11/205,205

(22) Filed: Aug. 17, 2005

(65) Prior Publication Data

US 2006/0091200 A1    May 4, 2006

(30) Foreign Application Priority Data

Nov. 1, 2004    (TW) .............................. 93133166 A

(51) Int. Cl.
*G06K 5/00*    (2006.01)
(52) U.S. Cl. .................................... 235/380
(58) Field of Classification Search ................. 235/380
See application file for complete search history.

(56) References Cited

U.S. PATENT DOCUMENTS 5,943,624 A * 8/1999 Fox et al. ................. 455/556.1

* cited by examiner

*Primary Examiner*—Michael G. Lee
*Assistant Examiner*—Tae W. Kim
(74) *Attorney, Agent, or Firm*—Bacon & Thomas, PLLC

(57) ABSTRACT

The present invention is to provide a method and an apparatus for integrating a mobile phone with a contactless IC card, wherein various data are preinstalled in the mobile phone for conducting different business transactions for a user simply by using a man-machine interface of the mobile phone to control each business transaction record processed through the contactless IC card, and the contactless IC card includes a memory device of the mobile phone for storing information and carrying out the all-in-one functions, enabling the mobile phone to perform a high-speed data transmission between a RF interface of the contactless IC card and a card reader so as to effectively increase the transmission power and distance for the contactless IC card.

3 Claims, 3 Drawing Sheets

METHOD AND APPARATUS FOR INTEGRATING A MOBILE PHONE WITH A CONTACTLESS IC CARD

FIELD OF THE INVENTION

The present invention relates to a method and an apparatus for integrating a mobile phone with a contactless IC card, and more particularly to a method and an apparatus for integrating a mobile phone with a contactless IC card to track all business transaction records of the contactless IC card and emit radio waves detectable by an detecting apparatus within an effective transmission range.

BACKGROUND OF THE INVENTION

As the development of science and technology is changing day after day, various IC cards are introduced to meet extensive consumer demands in hope of bringing a quicker, more convenient and secured consuming environment for consumers. The IC cards have a size approximately equal to a business card, which is easy to carry and it also includes a microchip for storing several tens of bytes to several tens of kilobytes of data. The IC cards have the functions of storing data and even executing application programs, and thus the IC cards are extensively used in many areas including identity cards, credit cards, electronic money, consumer bonus point cards, door security card, digital authentication cards, health insurance cards and telephone cards, etc in recent years. In general, an IC card is much more secured than the traditional magnetic card. For example, the general chip card can be divided into the following two kinds:

1. Memory Card: It is the earliest IC card that has the function of storing data and the capability of performing simple logical operations only. Since the memory card does not come with a microprocessor, therefore it cannot perform complicated mathematical operations, and has a low security. The memory card is an IC card generally used for the occasions requiring lower security, such as a telephone card, a door security card, and a mass rapid transit card, etc.

2. Smart Card: It is an IC card having a microprocessor and capable of performing complicated mathematical operations such as an encryption and a decryption, etc. Therefore, the IC card is more diversified, and also capable of carrying out a more complicated security mechanism to enhance the security of the IC card. Smart cards are widely used in European countries including France, Germany, Switzerland, Belgium, Demark, Portugal and England, etc. The smart card can be implemented into the electronic money system, and thus a consumer can use the smart card for mass transportation system, public phone, supermarket, parking lot and gas station, etc. Since the smart card has an irreplaceable security and convenience and its digital signature is widely accepted by consumers, therefore the smart card is extensively used for identity card, driver's license, health insurance card, transportation card, and personal digital signature applications.

Since the GSM mobile phones become increasingly popular, the demand for SIM cards is increased drastically, and thus speeding up the popularity of the smart card. After the STK specification is established, the application of smart cards ranges from its original simple telephone function to many additional functions such as online inquiry, shopping, placing order, money transfer, and electronic game, etc. Since the counterfeit of magnetic tape type credit cards is getting more severe, the Visa and MasterCard companies have to expedite the process of implementing the original magnetic tape type card into the smart card, so as to minimize unauthorized uses of credit cards. Visa introduced a Visa Smart/Debit Card (VSDC) system, and MasterCard introduced MasterCard Chip Card (M/Chip) system, and these companies believe that this system will totally change the consuming habits of consumers.

The smart card is divided into three types: a contact IC card, a contactless IC card, and a dual interface card according to its communication interface; wherein the contact IC card adopts a contact type interface suitable for a general application and an application requiring a higher security, and the contactless IC card adopts a contactless type interface suitable for a fast transmission or an environment with an installation of a card reader, such as a mass transportation card and parking card, etc., and the dual interface card concurrently includes the foregoing two interfaces and thus integrating the advantages of both.

In addition, the smart card includes a microprocessor, not only can execute a preinstalled operating system program, but also can set the data access control and carry out the internal and external authentication of the card. The installed EEPROM or flash memory can read and write data repeatedly to maximize the functions of the card, and its software or hardware data protection design can effectively prevent counterfeit and duplication. With a password mechanism such as DES, RSA, MD5 and SHA-1, etc, the security of the card can be further improved, so that the card can be used off-line to reduce the communication cost of the network. The open system operating platform of the card allows several cards to be applied on the same card, so as to achieve the all-in-one function.

Although the popular contactless IC card has the advantages of a higher transmission rate and a simpler circuit structure, the capacity of its built-in register is very limited and cannot save much information into the same IC card. As a result, consumers have to carry several different IC cards, and such card no longer has the all-in-one function. Further, the popular mobile phone adopts three kinds of transmission interfaces: a USB connection, an infrared transmission and a Bluetooth transmission for its data transmission; wherein the USB interface requires related hardware supports and is mainly used for the connection between a mobile phone and a computer; the infrared interface has a slower speed and a higher environment requirements; and the Bluetooth interface requires a more complicated circuit and comes with a higher price.

In recent years, contactless IC card and mobile phone become indispensable in our daily life, but it is quite inconvenient to carry several different cards for different application or occasions, and these cards lack of a unique and easy-to-inquire identity label. If a mobile phone is lost or stolen, it is difficult to recover it. Therefore, finding a way of integrating the contactless IC card and the mobile phone to achieve the all-in-one function and effectively control consumer information, enhance data transmission rate and recover lost phones demands immediate attentions.

SUMMARY OF THE INVENTION

The primary objective of the present invention is to integrate a contactless IC card with a mobile phone for an application and uses various data including those for public transportation, dining, shopping and consumer cards preinstalled in the mobile phone for conducting various business transactions. Such application does not require users to carry various different consumer cards but simply uses at least one man-machine interface (such as a display and a keyboard) of the mobile phone to control and acquire each business consumption record of the contactless IC card. The contactless IC card can use a memory space of the mobile phone to store information and implement the all-in-one function.

Another objective of the present invention is to perform a high-speed data transmission for a RF interface and a card reader of the contactless IC card used in the mobile phone, such that the contactless IC card having the original power supply system can further use the battery power supply of the mobile phone to effectively increase the transmission power and maximum distance of the contactless IC card.

A further objective of the present invention is to add a memory device in the contactless IC card for saving a unique identity code, and the memory device is connected directly to the RF interface, such that when the radio waves of the mobile phone pass through a valid radio wave transmission range of a detecting apparatus, the contactless IC card responds and converts the received radio waves into a stable voltage and also automatically sends the unique identity code stored in the memory device to the detecting apparatus through the RF interface, so as to leave a trace in each detecting apparatus. If the mobile phone is lost or stolen, the user can recover the lost mobile phone quickly according to the trace left by the unique identity code.

The above and other objects, features and advantages of the present invention will become apparent from the following detailed description taken with the accompanying drawings.

DETAILED DESCRIPTION OF THE PREFERRED EMBODIMENTS

Figure 1:
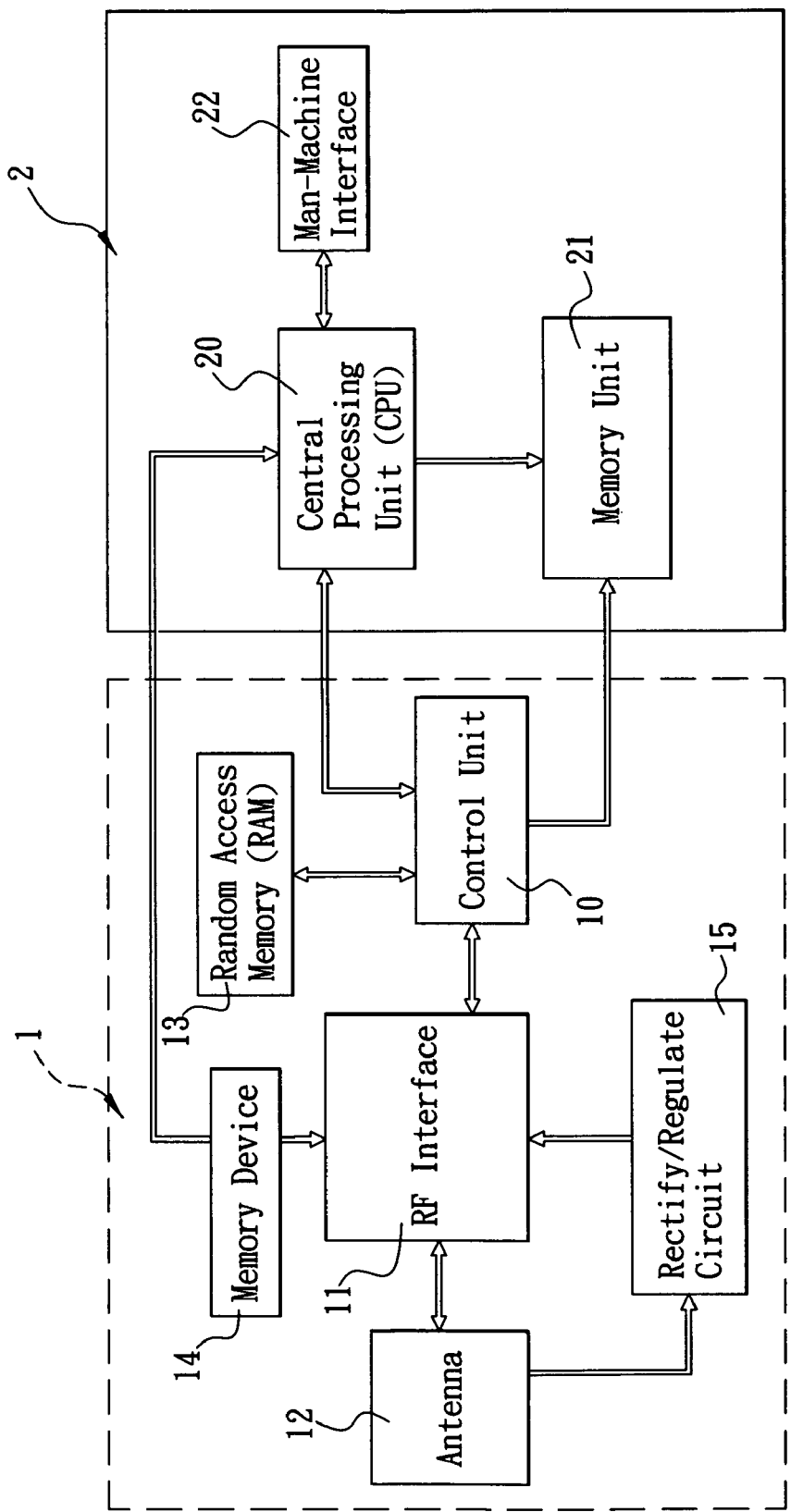
FIG. 1 is a schematic circuit block diagram of a preferred embodiment of the present invention.
Figure 2:
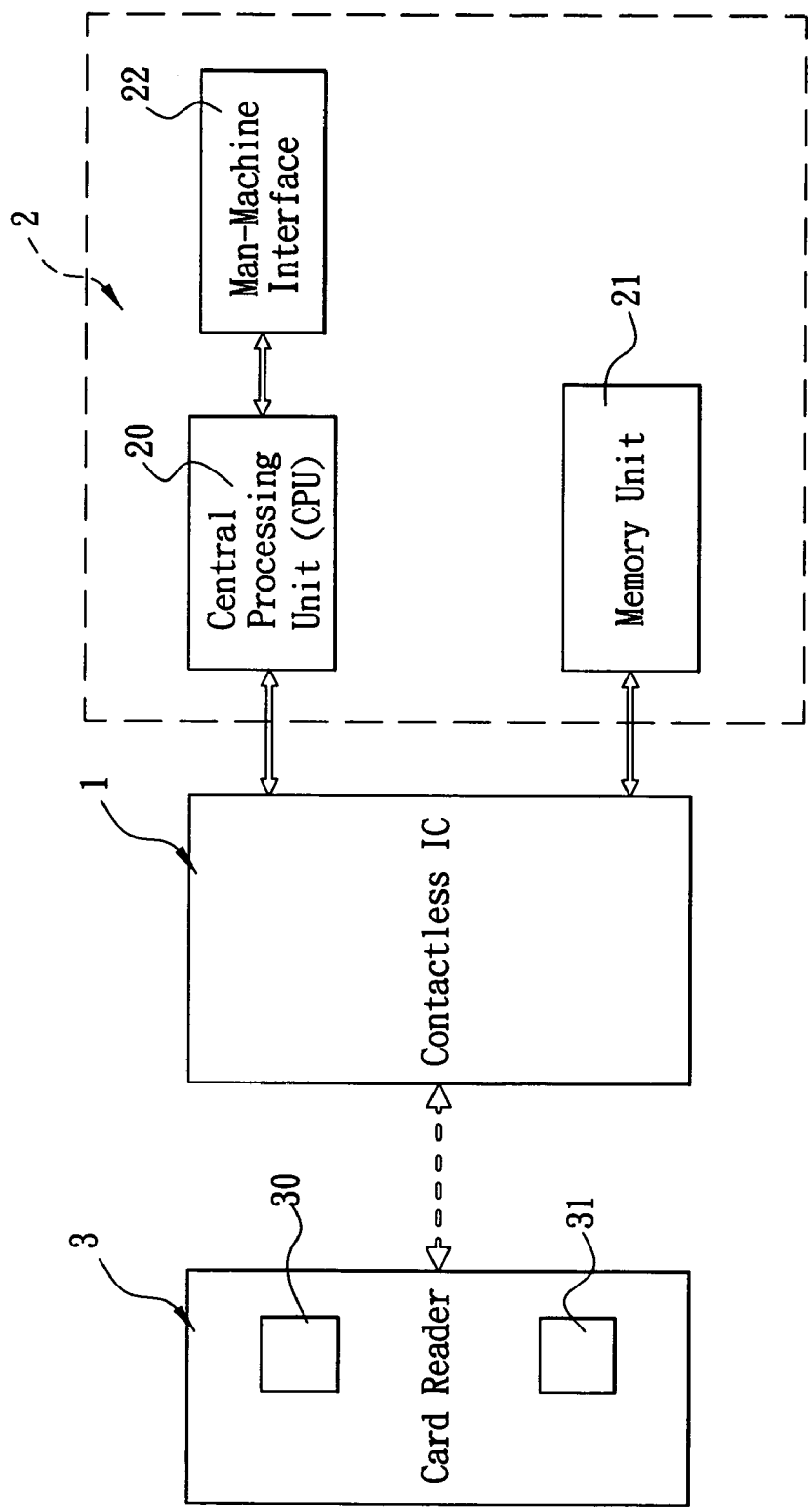
FIG. 2 is a schematic circuit block diagram of using a contactless IC card and a card reader for a business transaction according to the invention.

Referring to FIG. 1 for a method and an apparatus for integrating a mobile phone with a contactless IC card in accordance with the present invention, the contactless IC card 1 and the mobile phone 2 are connected, so that the mobile phone 2 can use a radio frequency (RF) interface 11 to carry out high-speed data transmissions between the mobile phone 2 and a card reader 3 of the contactless IC card 1 as shown in FIG. 2. When the contactless IC card 1 is used for various business transactions, a user can use at least one man-machine interface 22 (such as a display and a keyboard) of the mobile phone 2 to control and acquire each record of the business transaction. The contactless IC card 1 can use a battery power supply (not shown in the figure) of the mobile phone 2 to effectively improve its transmission power and distance. The contactless IC card 1 includes a memory device 14 for storing a unique identity code, and the memory device 14 is connected directly to the RF interface 11. If a radio wave of the mobile phone 2 enters a valid radio wave transmission range of a detecting apparatus, the contactless IC card 1 will respond and convert the received radio wave into a stable voltage and provide the required electric power to the contactless IC card 1. The unique identity code stored in the memory device 14 is sent to the detecting apparatus through the RF interface 11, and thus a user can trace and recover the lost mobile phone according to the record of the identity code stored in the detecting apparatus.

Referring to FIG. 1 for a preferred embodiment of the present invention, the contactless IC card 1 (also known as IC card subsystem) includes a control unit 10 for controlling each electronic device in the contactless IC card 1, so that the electronic devices can operate normally. A RF interface 11 is connected to the control unit 10 for converting data information transmitted from the control unit 10 into RF information or converting the received RF information into data information, and then sending it to the control unit 10; an antenna 12 is connected to the RF interface 11 for sending out the RF information transmitted from the RF interface 11 or sending the received RF information to the RF interface 11; a random access memory (RAM) 13 is connected to the control unit 10 for storing the information required for the normal operation; the memory device 14 is connected to the RF interface 11 for saving a unique identity code, and in this embodiment, the memory device 14 could be a read only memory (ROM); and a rectify/regulate circuit 15, and the rectify/regulate circuit 15 can use the received radio wave to produce a stable voltage to be used by each electronic device in the contactless IC card 1, so that each electronic device can operate normally. The mobile phone 2 includes a CPU 20 for controlling the normal operation of each electronic device in the mobile phone 2; a memory unit 21 is connected to the CPU 20 and including a static random access memory (SRAM) and a flash memory, etc for storing the information required for a normal operation; at least one man-machine interface 22, and each man-machine interface 22 refers to any usable interface such as a keyboard and a handwriting input device connected to the CPU 20 for users to input information or output information to a user's reading interface such as a liquid crystal display and a printer, etc. In the present invention, if a user connects the contactless IC card 1 and the mobile phone 2 and use them together, then the control unit 10 and the memory device 14 of the contactless IC card 1 will connect to the CPU 20 of the mobile phone 2 separately, such that the mobile phone 2 can control and acquire each record of business transaction of the contactless IC card 1, and use the RF interface 11 of the contactless IC card 1 to achieve a high-speed data transmission. The control unit 10 of the contactless IC card 1 is coupled to the memory unit 21 of the mobile phone 2, so that the contactless IC card 1 can read various information (including the related information for public transportation, shopping and consumer cards such as credit cards, cash cards and charge cards) preinstalled in the mobile phone 2 by users. Therefore, when the user is using the contactless IC card 1 for different business transactions, the user does not have to carry many different consumer cards for such business transactions.

Since the memory unit 21 of the mobile phone 2 of this embodiment includes a large memory, therefore the user can store information related to various different consumer cards in the memory unit 21. When the contactless IC card 1 is used for a business transaction, different information stored in the memory unit 21 can be shared. Each record of business transactions of the contactless IC card 1 can be controlled and read through the man-machine interface 22 of the mobile phone 2. If a user uses the contactless IC card 1 for a business transaction via a card reader 3 as shown in FIG. 2, its operation and processing procedure are illustrated below:

Step (101): Firstly, the card reader 3 issues an operating authentication code to the contactless IC card 1;

Step (102): After the control unit 10 of the contactless IC card 1 has received the operating authentication code, it will search the operating authentication code in the memory unit 21 of the mobile phone 2;

Step (103): After the operating authentication code is searched, the contactless IC card 1 will issue an acknowledge signal to the card reader 3;

Step (104): The card reader 3 starts reading the transaction information. If a user has a transaction of a large amount, the card reader 3 will issue an operating signal for identity confirmation to the contactless IC card 1 when confirming the user's identity of a card issuing bank;

Step (105): After the control unit 10 of the contactless IC card 1 has received the operating signal for identity confirmation, the operating signal will be sent to the CPU 20 of the mobile phone 2;

Step (106): The CPU 20 of the mobile phone 2 drives the man-machine interface 22 (such as a liquid crystal display) to display the identity information required by the card issuing bank on the man-machine interface 22;

Step (107): After the CPU 20 of the mobile phone 2 has read the inputted identity information through the man-machine interface 22 (such as a keyboard), the identity information is sent to the card issuing bank for identity confirmation through the contactless IC card 1 and the card reader 3;

Step (108) After the card issuing bank confirms the user's identity, the card reader 3 will continue reading the business transaction information.

When a user uses the contactless IC card 1 and the mobile phone 2 for carrying out various business transaction, the contactless IC card 1 can share various different information stored in the memory unit 21 of the mobile phone 2. Therefore, the user does not have to carry many different cards, but just needs to use the man-machine interface 22 such as a liquid crystal display and a keyboard of the mobile phone 2 to control and acquire each record of business transaction of the contactless IC card 1 and achieve the all-in-one function easily.

Further, the CPU 20 of the mobile phone 2 of the preferred embodiment uses the contactless IC card 1 and the RF interface 11 to carry out a high-speed data transmission with the card reader 3. Referring to FIG. 2 for the high-speed data transmission, the data processing procedure for sending out the data is described as follows:

Step (200): If the CPU 20 of the mobile phone 2 has read the data inputted by the user from the man-machine interface 22 such as a keyboard to send out an instruction, the data will be sent to the control unit 10 of the contactless IC card 1;

Step (201): By that time, the control unit 10 of the contactless IC card 1 sends a request signal to a data receiving apparatus 30 of the card reader 3;

Step (202) After the data receiving apparatus 30 has received the request signal, an acknowledge signal will be sent to the contactless IC card 1;

Step (203) After the contactless IC card 1 has received the acknowledge signal, the contactless IC card 1 reads the data directly from the memory unit 21 of the mobile phone 2 and then decodes and modulates the signal and sends it out from the RF interface 11.

The data processing procedure for receiving the data is described below:

Step (204): A data receiving apparatus 31 of the card reader 3 sends a request signal to the contactless IC card 1;

Step (205): After the contactless IC card 1 has received the request signal, the request signal will be sent to the CPU 20 of the mobile phone 2;

Step (206): After the mobile phone 2 has received the request signal, the CPU 20 drives the man-machine interface 22 such as a display device to display the request signal for the user's confirmation;

Step (207): After the mobile phone 2 has read the acknowledge signal inputted from the man-machine interface 22 such as a keyboard by the user, and the acknowledge signal is sent out from the RF interface 11 of the contactless IC card 1;

Step (208): After receiving the acknowledge signal, the data sending apparatus 31 starts sending out the data to the contactless IC card 1;

Step (209): After receiving the data transmitted from the data sending apparatus 31, the contactless IC card 1 modulates and decodes the data, and then saves the data into the memory unit 21 of the mobile phone 2.

Figure 3:
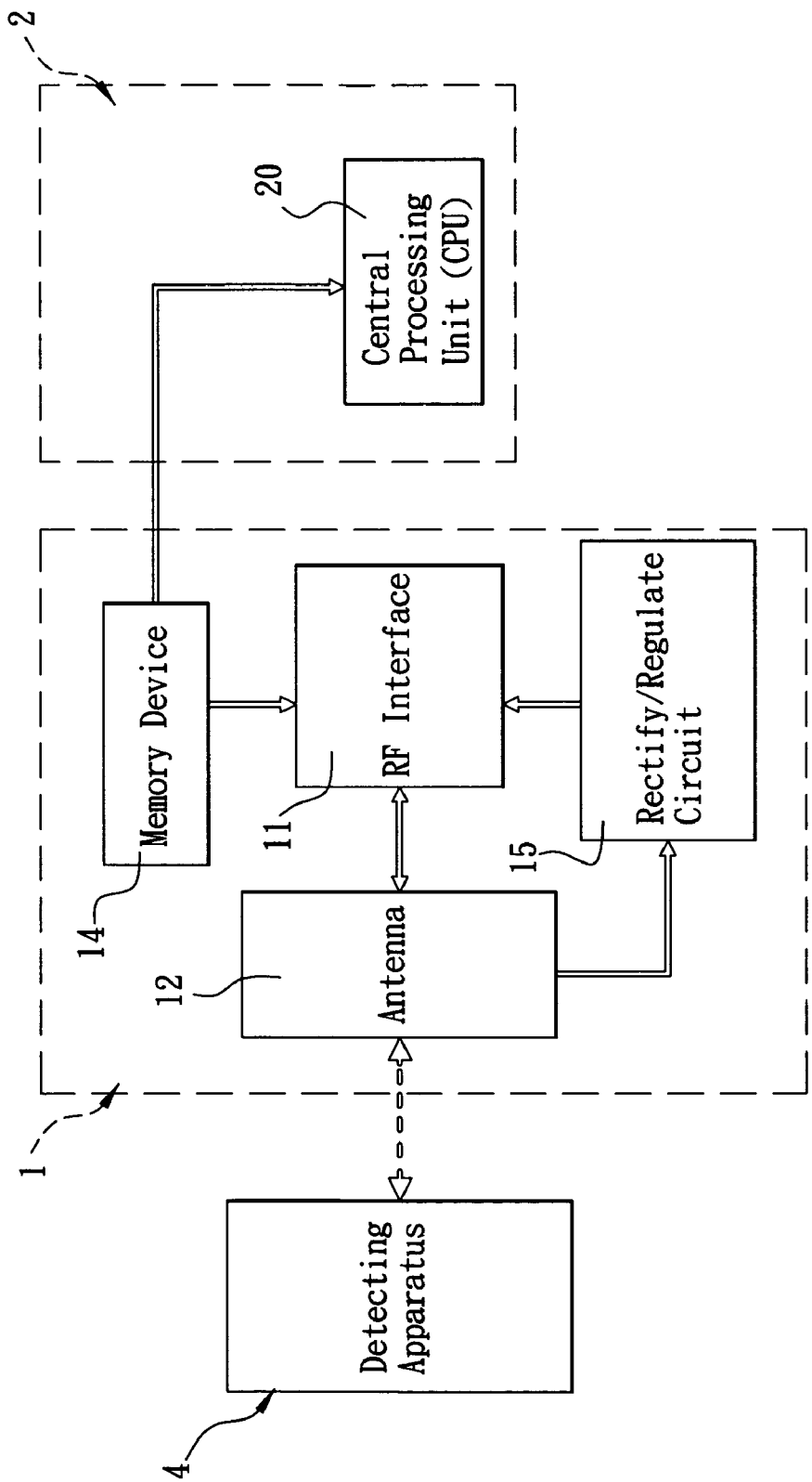
FIG. 3 is a schematic circuit block diagram of the operations of the mobile phone, contactless IC card and detecting apparatus when the mobile phone is lost or stolen according to the invention.

If the mobile phone 2 is lost or stolen, the situation may be more serious than we thought. Therefore, the inventor of the present invention adds a mechanism for locating the lost mobile phone 2, and the mechanism bases on the increasingly popular door security identification device installed or about to be installed in public places such as the security door in an airport or a bus station and the magnetic detection door of a mall or a supermarket. This mechanism is used as a detecting apparatus and connected to the police security system to carry out the door security identification and safety. Therefore, the theft of mobile phones 2 occurred in a densely populated city can be located by the foregoing security system network and the lost mobile phone 2 can be recovered quickly. The present invention stores a unique identity code in the memory device 14 of the contactless IC card 1, and the identity code corresponds to the identity code of the mobile phone 2 and is unalterable. If the identity code is altered by force, the memory device 14 will be damaged permanently and the mobile phone 2 will be unable to pass the authentication and thus the mobile phone cannot be turned on. In such case, professional staffs have to replace the memory device to solve the problem. If a user's mobile phone 2 is lost or stolen, then the contactless IC card 1 will contact with the foregoing detecting apparatus that continuously produces the radio waves in the city by carrying out the procedure as shown in FIG. 3 to successfully complete the mission of recovering the lost mobile phone 2 as follows.

Step (300): Each detecting apparatus 4 continuously produces the radio waves;

Step (301): When the mobile phone 2 connecting with the contactless IC card 1 goes through an effective transmission range of the detecting apparatus 4, the antenna 12 of the contactless IC card 1 responds and drives the rectify/regulate circuit 15 to produce a stable voltage for the normal operation of the contactless IC card 1 according to the received radio waves;

Step (302): The contactless IC card 1 sends the unique identity code stored in the memory device 14 to the detecting apparatus 4 through the RF interface 11.

If a user's mobile phone 2 is lost or stolen, the user just needs to inform the police with the identity code, and the policy can search the identity code through each detecting apparatus 4 of the police security system to trace and recover the mobile 2. Since the antenna 12 of the contactless IC card 1 sends out the radio wave to produce an induced current according to each detecting apparatus 4, and the rectify/regulate circuit 15 after being rectified and regulated is provided for the contactless IC card 1, therefore even if the mobile phone 2 is turned off, the contactless IC card 1 still can send out the identity code automatically when passing through an effective transmission range of each detecting apparatus 4. As a result, the lost mobile phone 2 can be found easily provided that the mobile phone 2 is placed within the effective transmission range of the detecting apparatus 4, even the thief can escape with luck.

While the invention has been described by means of specific embodiments, numerous modifications and variations could be made thereto by those skilled in the art without departing from the scope and spirit of the invention set forth in the claims.

What is claimed is:

1. An apparatus for integrating a mobile phone with a contactless IC card, comprising:
    a contactless IC card, including:
        a control unit for controlling each electronic device installed in said contactless IC card;
        a radio frequency (RF) coupled with said control unit for converting information transmitted from said control unit into radio frequency (RF) information or converting RF information into data information and then sending said information to said control unit;
        a memory device coupled to said radio frequency (RF) interface for saving a unique identity code;
        a random access memory (RAM), coupled with said control unit for storing information required for a normal operation of said contactless IC card; a rectify/regulate circuit, capable of using said received radio wave to produce a voltage for a normal operation of said each electronic device installed in said contactless IC card; and a mobile phone, including
    a central processing unit (CPU) for controlling said each electronic device installed in said mobile phone;
    a memory unit, coupled to said CPU for storing information required for a normal operation of said mobile phone; and
    at least one man-machine interface, coupled to said CPU for a user to input information or output information for a user to read;
    wherein when-said contactless IC card-and-said mobile phone are connected, said control unit and said memory device of said contactless IC card are coupled with said CPU of said mobile phone separately, and said CPU carries out a high-speed data transmission through said RF interface of said contactless IC card, and said control unit of said contactless IC card is coupled with said memory unit of said mobile phone, such that said memory unit of said contactless IC card is configured for reading various information preinstalled in said mobile phone.

2. The apparatus for integrating a mobile phone with a contactless IC card of claim 1, wherein said memory unit includes a static random access memory (SRAM) and a flash memory.

3. The apparatus for integrating a mobile phone with a contactless IC card of claim 1, wherein said contactless IC card further comprises an antenna coupled to said RF interface for sending out said RF information transmitted from said RF interface or sending said received RF information to said RF interface.

* * * * *